(12) United States Patent
Jagre et al.

(10) Patent No.: US 9,710,733 B2
(45) Date of Patent: Jul. 18, 2017

(54) FIELD PROGRAMMABLE GATE ARRAY AND CORRESPONDING METHOD FOR DYNAMIC PRINT TECHNOLOGIES

(71) Applicant: Markem-Imaje Holding, Bourg-les-Valence (FR)

(72) Inventors: Erik Jagre, Gothenburg (SE); Mikael Palmen, Lindome (SE)

(73) Assignee: Markem-Imaje Holding, Bourg-les-Valence (FR)

( * ) Notice: Subject to any disclaimer, the term of this patent is extended or adjusted under 35 U.S.C. 154(b) by 57 days.

(21) Appl. No.: 14/378,594

(22) PCT Filed: Feb. 21, 2013

(86) PCT No.: PCT/IB2013/000650
§ 371 (c)(1),
(2) Date: Aug. 13, 2014

(87) PCT Pub. No.: WO2013/124737
PCT Pub. Date: Aug. 29, 2013

(65) Prior Publication Data
US 2016/0034792 A1    Feb. 4, 2016

Related U.S. Application Data

(60) Provisional application No. 61/601,051, filed on Feb. 21, 2012.

(51) Int. Cl.
*G06F 3/12* (2006.01)
*G06K 15/02* (2006.01)
*G06F 15/78* (2006.01)

(52) U.S. Cl.
CPC ..... *G06K 15/1805* (2013.01); *G06F 15/7867* (2013.01); *G06K 15/18* (2013.01); *G06K 15/1894* (2013.01)

(58) Field of Classification Search
USPC .......................................... 358/1.15
See application file for complete search history.

(56) References Cited

U.S. PATENT DOCUMENTS 6,116,716 A * 9/2000 Tajika ................. B41J 2/04563
347/19
2006/0092437 A1* 5/2006 Martin ................. G06F 3/1204
358/1.8
2010/0214597 A1* 8/2010 Hasseler ................. B41J 29/38
358/1.15

FOREIGN PATENT DOCUMENTS

| CN | 100483327 C | 4/2009 |
|----|-------------|--------|
| FR | 2816428 | 5/2002 |
| JP | 2000112744 | 4/2000 |

OTHER PUBLICATIONS

International Search Report from corresponding International Application No. PCT/IB2013/000650, mailed on Aug. 30, 2013.
(Continued)

*Primary Examiner* — Marivelisse Santiago Cordero
*Assistant Examiner* — Neil R McLean
(74) *Attorney, Agent, or Firm* — Renner, Otto, Boisselle & Sklar, LLP

(57) ABSTRACT

Example embodiments presented herein are directed towards the implementation of a FPGA where a printing core may be dynamically reconfigured with respect to a currently used printing type. Example embodiments are also directed towards print handling, direct memory access printing, and the use of an internal FPGA timer.

21 Claims, 6 Drawing Sheets

(56) References Cited

OTHER PUBLICATIONS

International Preliminary Report on Patentability from corresponding International Application No. PCT/IB2013/000650, mailed on Jun. 17, 2014.
Office Action dated Mar. 7, 2017 for corresponding CN application No. 201380010326.6 (English translation thereof).

* cited by examiner

FIELD PROGRAMMABLE GATE ARRAY AND CORRESPONDING METHOD FOR DYNAMIC PRINT TECHNOLOGIES

TECHNICAL FIELD

Example embodiments presented herein relate to systems related to industrial printing and associated methods therein.

BACKGROUND

A Field Programmable Gate Array (FPGA) is an integrated circuit which may be configured by a customer or designer after manufacturing. Thus, FPGAs provide the ability to update functionality after shipping and/or manufacturing. FPGAs may also be partial re-configured where a portion of the design may be reprogrammed.

SUMMARY

With respect to mass printing applications, FPGAs are typically configured in a 'black-box' configuration. Specifically, the print specific technology, or the core functionality of the FPGA is provided, whereas external peripherals are typically left blank to be provided by a developer. With such a configuration, a separate FPGA must be utilized for each specific print technology. Therefore, a need exists for a single FPGA which may be utilized for various forms of print technologies.

Thus, some of the example embodiments may be directed towards a method for preconfiguring a Field Programmable Gate Array (FPGA). The method comprises implementing at least one common printing peripheral module, said common printing peripheral module being common with respect to different print technologies. The method also comprises implementing at least one dynamically reconfigurable printing core module, said at least one dynamically reconfigurable printing core module being reconfigurable based on a currently used print technology.

Some example embodiments may be directed towards a method, in a Field Programmable Gate Array (FPGA), for print handling, the FPGA comprising at least one common printing peripheral module, said common printing module being common with respect to different print technologies. The method comprises detecting a currently used print technology. The method also comprises dynamically reconfiguring at least one printing core module based on the currently used print technology.

Some example embodiments may be directed towards a Field Programmable Gate Array (FPGA) for print handling. The FPGA comprises at least one common printing peripheral module, said common printing module being common with respect to different print technologies. The FPGA also comprises at least one reconfigurable printing core module and a detection unit to detect a currently used printing technology. The FPGA further comprises a configuration unit to dynamically reconfigure the at least one printing core module based on the currently used print technology.

Some example embodiments may be directed towards a Field Programmable Gate Array (FPGA) for print handling. The FPGA comprises at least one common printing peripheral module, said common printing peripheral module being common with respect to different print technologies. The FPGA also comprises at least one dynamically reconfigurable printing core module, said at least one dynamically reconfigurable printing core module being reconfigurable based on a currently used print technology.

Some example embodiments may be directed towards a method, in an industrial printing unit, for reading out print data. The method comprises updating a memory unit with print data once said print data has been changed. The method also comprises reading out said print data for industrial printing via a direct memory access based on a received trigger.

Some example embodiments are directed towards an industrial printing unit for reading out print data. The printing unit comprises an updating unit for updating a memory unit with print data once said print data has been changed. The printing unit also comprises a read out unit for reading out said print data for industrial printing via a direct memory access based on a received trigger.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
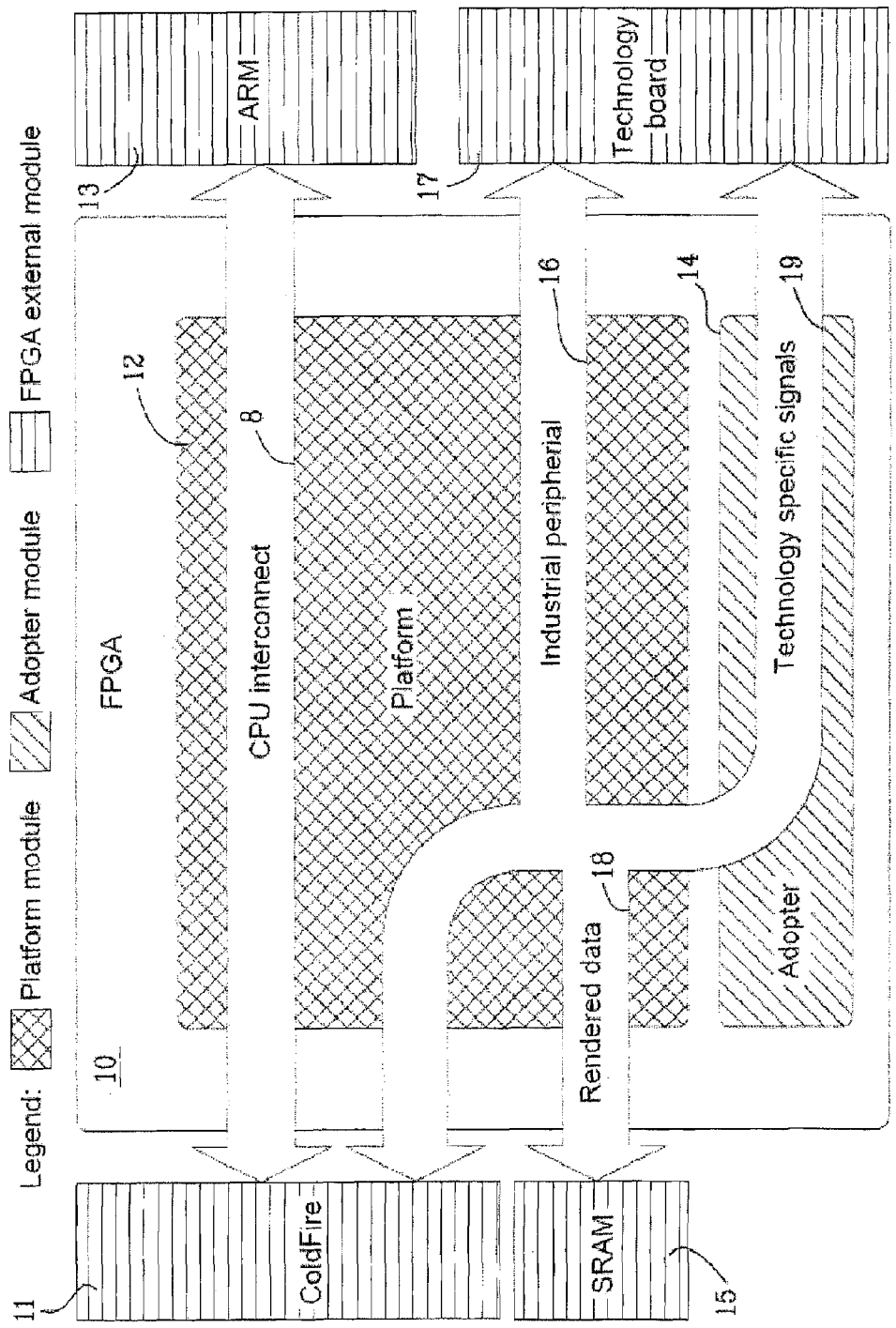
FIG. 1 is a schematic of a FPGA configuration, according to some of the example embodiments.

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Example embodiments are presented herein for a single FPGA which may be utilized for various forms of print technologies. An example of such a FPGA is provided in FIG. 1. The FPGA 10 may provide an interconnection between two microprocessors. Specifically, the FPGA 10 may provide interconnections to a ColdFire (CF) microprocessor 11 and an ARM microprocessor 13. The FPGA 10 may also be in connection with a memory unit, for example SRAM 15, and a technology board 17.

The FPGA 10 may comprise two main components, a platform component 12 and an adopter component 14. The platform component 12 may comprise any number of common printing peripheral modules, which may be common with respect to different types of printing technologies. The adopter component 14 may comprise any number of modules which may be specific to a printing technology which is currently in use. Thus, the adopter component 14 may be dynamically reconfigured depending on a current print technology.

Figure 2:
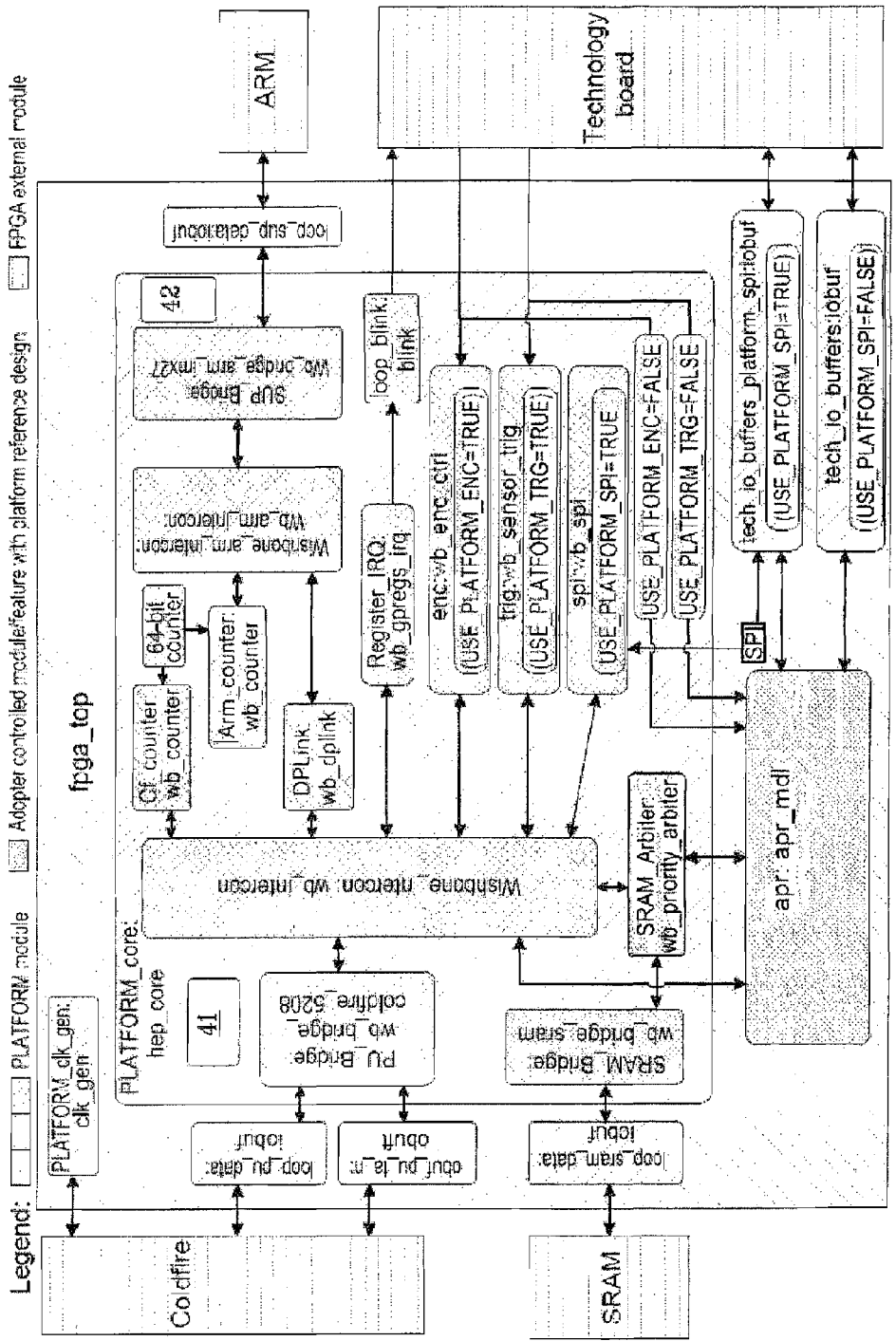
FIG. 2 is a detailed schematic of the FPGA configuration of FIG. 1, according to some of the example embodiments.

FIG. 2 provides a detailed schematic of the various peripherals that may be comprised in the FPGA of FIG. 1. The follow table provides a description for the various peripherals which are comprised in FIG. 2.

| PERIPHERAL | DESCRIPTION | PURPOSE |
|---|---|---|
| fpga_top (common peripheral) | Top wrapper | Serves as a interconnect module for:<br>apr<br>PLATFORM_core<br>PLATFORM_clk_gen<br>loop_pu_data<br>obuf_pu_ta_n<br>loop_sram_data<br>loop_sup_data<br>loop_tech_io |
| apr (dynamically reconfigurable peripheral) | Adopter getting started core | Demonstrate how the different interfaces can be used |
| PLATFORM_core (common peripheral) | Platform wrapper | Serves as a interconnect module for:<br>PU_Bridge<br>SRAM_Bridge<br>Wishbone_intercon<br>Wishbone_arm_intercon<br>SRAM_Arbiter<br>DPLink<br>Register_IRQ<br>SUP_Bridge<br>enc<br>loop_blink<br>Trig<br>SPI<br>64-bit counter with wishbone slaves |
| loop_pu_data | I/O buffer for ColdFire data bus | Enable bus sharing |
| obuf_pu_ta_n | Tri-state buffer for ColdFire transfer acknowledge | Enable bus sharing |
| loop_sram_data | I/O buffer for SRAM data bus | Enable bus sharing |
| PLATFORM_clk_gen | Clock and reset control | Generates the different clock and reset signals. The reset signal is asserted asynchronously and released synchronously to the generated clock |
| loop_sup_data | I/O buffer for ARM data bus | Enable bus sharing |
| tech_io_buffers | I/O buffer for adopter technology signals | Provide bi-directional pins to adopter without revealing the physical pins, adopter choice if instantiated or not. |
| tech_io_buffers_platform_spi | I/O buffer for adopter technology signals | Provide bi-directional pins to adopter without revealing the physical pins, adopter choice if instantiated or not. |
| PU_Bridge | ColdFire FlexBus to Wishbone bridge | Allow ColdFire CPU to access FPGA application |
| SRAM_Bridge | SRAM/Wishbone bridge | Allow FPGA design to access external SRAM |
| Wishbone_intercon | Wishbone interconnect unit, address decoder | Decode internal Wishbone bus addresses |
| Wishbone_arm_intercon | Wishbone interconnect unit for ARM access, address decoder | Decode internal Wishbone bus addresses |
| SRAM_Arbiter | Wishbone arbiter | Enable sharing of SRAM between apr and and ColdFire |
| DPLink | Dual port data buffer | Provide a CPU interconnect data channel |
| Register_IRQ | Configuration registers | Provide configuration settings for platform blocks and interrupt handling |

-continued

| PERIPHERAL | DESCRIPTION | PURPOSE |
| --- | --- | --- |
| SUP_Bridge | ARM WEIM to Wishbone Bridge | Allow ARM CPU to access FPGA application |
| enc | Unit for controlling external/internal encoder | Scale encoder and count tics and emulate encoder tics |
| loop_blink | Unit that blinks an output when enabled | Relax software from basic I/O handling |
| Trig | Unit for controlling external/internal trig cell | Trig filtering/de-bouncing and emulate trig pulses |
| SPI | A SPI Master connected to Wishbone as a slave | Provide possibility to connect HEP external SPI slaves |
| 64-bit counter | A 64 bit free running counter connected to CF and ARM Wishbone as a slave | Provide common time with high resolution for both ARM and CF |

The FPGA of FIG. 2 may also comprise a detection unit 41 and a configuration unit 42. The detection unit may be configured to detect a currently used print technology. The configuration unit may be configured to dynamically reconfigure the reconfigurable printing core modules. It should be appreciated that both the detection unit 41 and the configuration unit 42 may be implemented as common printing core modules. It should be appreciated that the detection unit 41 and configuration unit 42 need not be comprised as separate units. Furthermore, the detection unit 41 and configuration unit 42 may be any suitable type of computation unit, e.g. a microprocessor, or a digital signal processor (DSP).

Figure 3:
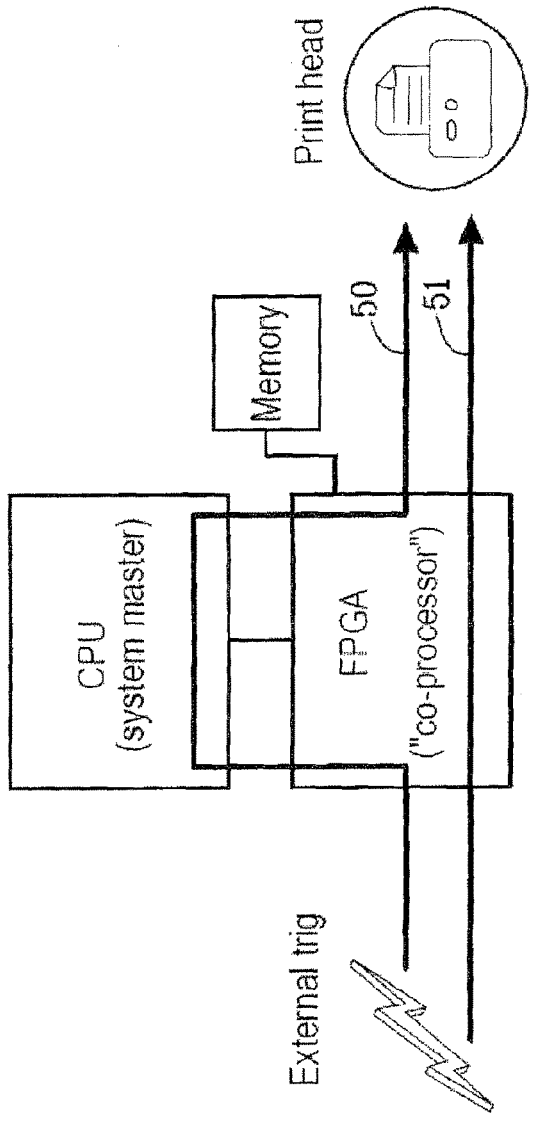
FIG. 3 is a block diagram depicting printing with a direct FPGA memory access, according to some of the example embodiments.

FIG. 3 provides an example of FPGA direct memory access printing. The bold line labeled 50 represents the flow of operations according to prior art methods. Typically, after an external trigger, indicating a printing procedure is about to occur, is received a software generated interrupt will be sent to the FPGA. Thereafter, the CPU may retrieve and prepare the data to be printed and send the prepared data to the FPGA. The FPGA may send the prepared data directly to the print-head for printing.

The bold line labeled 51 represents the flow of operations according to some of the example embodiments presented herein. In the example embodiment illustrated by line 51, upon receiving an external trigger the FPGA may directly access the print data from a memory unit and send the print data directly to the print-head. The operation illustrated by line 51 is performed without the involvement of the CPU. However, according to some example embodiments, the CPU may update the memory unit whenever a change in the data to be printed occurs. For example, if the data to be printed comprises a print date, the data may be updated each day after a change in date occurs. By eliminating the involvement of the CPU during printing, printing times may be shortened as the signaling path for printing will be reduced. It should be appreciated that the FPGA direct memory access printing may be provided as a common printing peripheral module.

Figure 4:
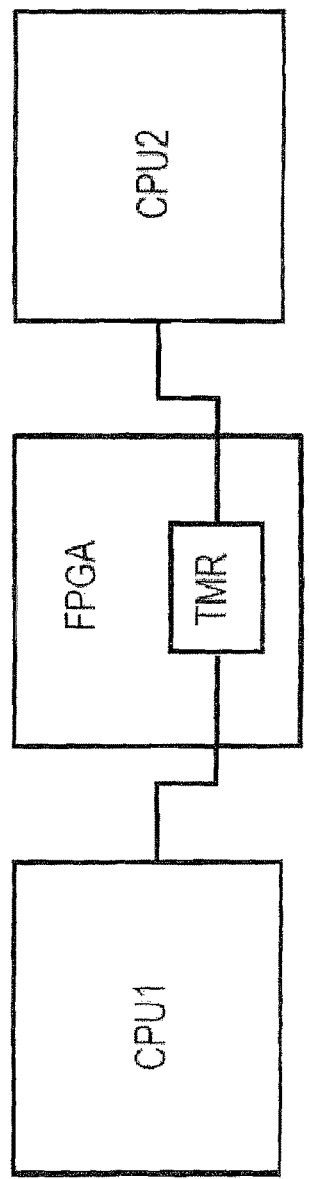
FIG. 4 is a block diagram of a FPGA timer and synchronization provided by the same, according to some of the example embodiments.

FIG. 4 illustrates an example of an internal FPGA timer (TMR). Typical industrial printing FPGAs do not comprise an internal FPGA timer. Instead synchronization of various printing components is provided with the use of pulse timing. Pulse timing comprises the measurement of time based on the number of pulses which have elapsed. The use of pulse timing does not provide an accurate time value.

However, with the use of an internal FPGA timer, an absolute time value (e.g., down to a nano-second time scale) may be provided. Such a feature may be useful for printing which requires precise timing. Furthermore, in a large industrial printing setting, the use of an absolute time value may be helpful to synchronize multiple printers or microprocessors.

Figure 5:
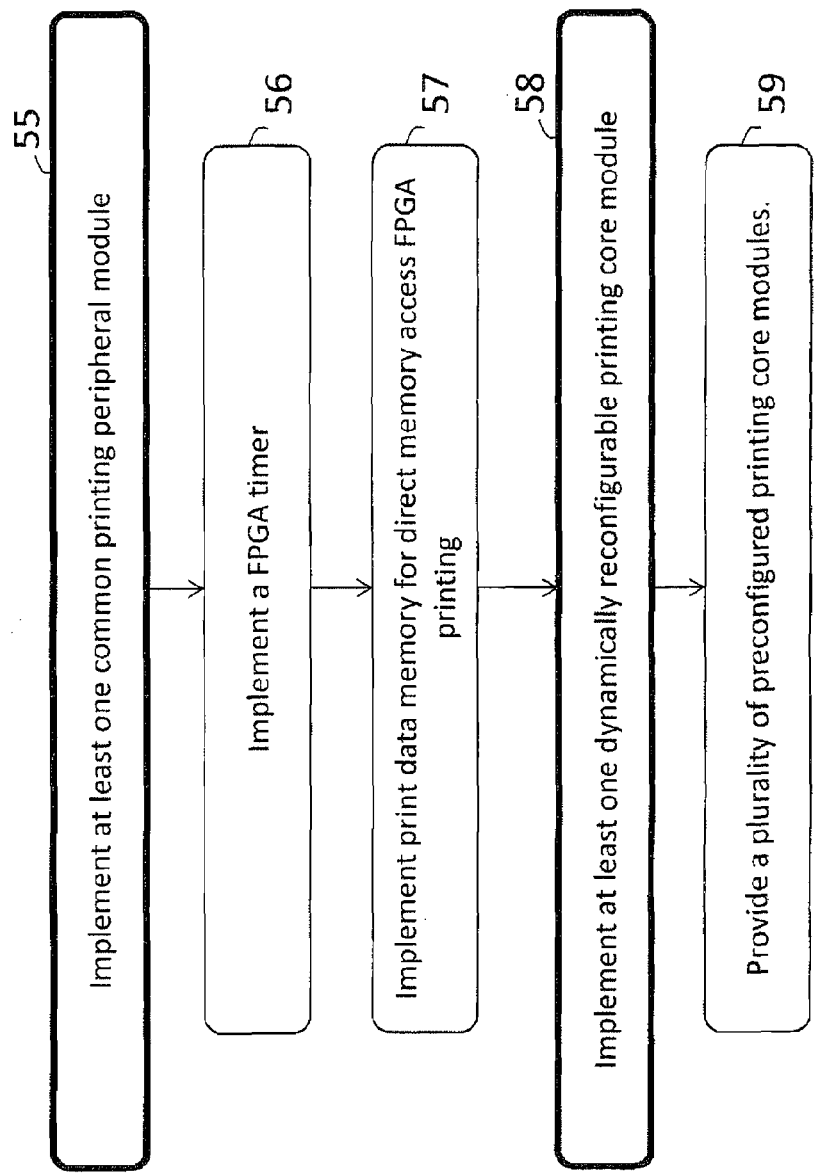
FIG. 5 is a flow diagram depicting example operations which may be taken in the reconfiguration of the FPGA of FIGS. 1 and 2, according to some of the example embodiments.

FIG. 5 illustrates a flow diagram of example operational steps which may be taken in the implementation or pre-configuration of the FPGA of FIGS. 1 and 2.

Example Operation 55

According to some of the example embodiments the pre-configuration of the FPGA may comprise implementing 55 at least one common printing peripheral module, where the common printing peripheral module is common with respect to different print technologies.

A few non-limiting examples of the at least one common printing peripheral module may be an encoder interface, trigger functionality, interrupt capturing mechanisms, status functionality, and/or input/output functionality. A few non-limiting examples of the printing technologies may be at least one of a vector, raster, and/or RFID print type.

Example Operation 56

According to some of the example embodiments, the pre-configuration may also comprise implementing 56 a FPGA timer, where the FPGA timer may provide synchronization across a plurality of microprocessors associated with the FPGA, as explained in conjunction with FIG. 4. It should be appreciated that the FPGA timer and its functionality may be implemented as a common printing peripheral module.

Example Operation 57

According to some of the example embodiments, the pre-configuration may further comprise implementing 57 print data memory for storing print specific data utilized in direct memory access FPGA printing, as explained in conjunction with FIG. 3. It should be appreciated that the direct memory access FPGA printing functionality may be implemented as a common printing peripheral module.

Example Operation 58

According to some of the example embodiments, the pre-configuration also comprises implementing 58 at least one dynamically reconfigurable printing core module, where the dynamically reconfigurable printing core module is reconfigurable based on a currently used print technology.

Example Operation 59

According to some of the example embodiments the implementing 58 may further comprise providing 59 a plurality of preconfigured printing core modules, wherein the pre-configuration of the printing core modules may be based on a printing technology. This feature is described in conjunction with FIGS. 1 and 2.

The plurality of preconfigured printing core modules may be stored in the SRAM memory which is accessible by the FPGA, any other FPGA accessible memory, or an internal FPGA memory. It should be appreciated that the plurality of printing core modules may be stored in respective print-heads. For example, a vector pre-configuration may be stored in a vector print-head. Thus, once the vector print-head connects to the technology board, the vector pre-configuration may be downloaded and used in the dynamic reconfiguration of the printing core module. The plurality of printing core modules may also be provided in a separate or external memory source so that a user may provide the appropriate printing core module during the dynamic reconfiguration.

Figure 6:
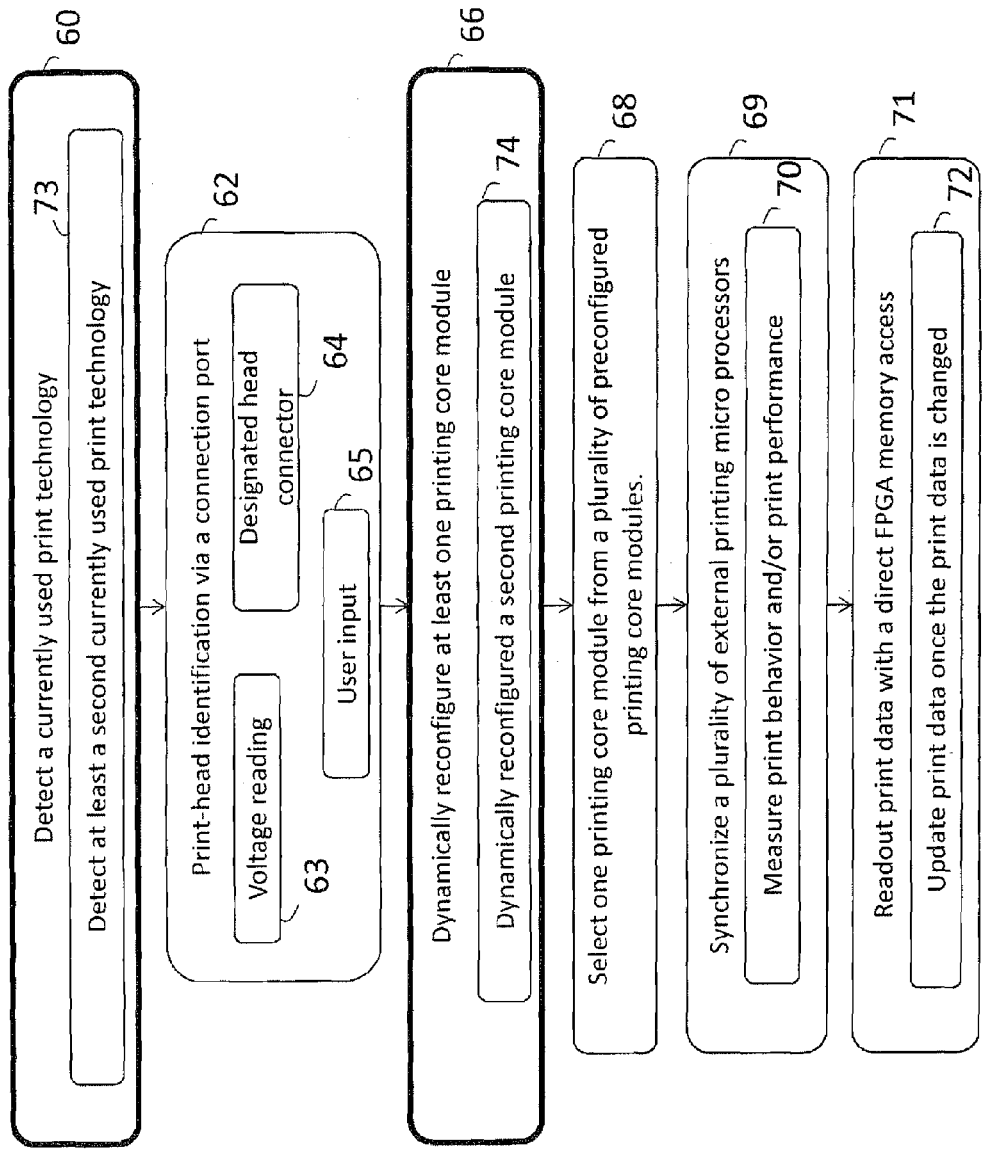
FIG. 6 is a flow diagram depicting example operations which may be taken during print handling with the FPGA system of FIGS. 1 and 2, according to some of the example embodiments.

FIG. 6 is a flow diagram depicting example operational steps which may be taken by the FPGA of FIGS. 1 and 2 during print handling.

Example Operation 60

According to some of the example embodiments, the FPGA may detect 60 a currently used print technology. A detection unit may be configured to perform the detecting 60. It should be appreciated that the detecting unit 41 may be configured as a common printing peripheral module.

Example Operation 62

According to some of the example embodiments, the detecting 60 may further comprise receiving 62 a print-head identification from a connection port and determining the currently used print technology based on the print-head identification. The detection unit 41 may be configured to perform the receiving 61 and determining.

Example Operation 63

According to some of the example embodiments, the receiving 62 may comprise receiving 63 a voltage reading associated with a print-head connection and determining the print-head type configuration based on the value of the voltage reading. The detection unit 41 may be configured to perform the receiving 63.

It should be appreciated that print-heads corresponding to different types of printing technologies may produce different values of voltage during an initial connection. Thus, by measuring the voltage reading, a print-head identification may be made.

Example Operation 64

According to some of the example embodiments, the receiving 62 may comprise receiving 64 the print-head identification from a designated head connector. The detection unit 41 may be configured to perform the receiving 64.

It should be appreciated that the print-head may be preconfigured to the print-head identification. Thus, upon connection the print-head identification may be sent to the detection unit 41. It should further be appreciated that the print-head may also be configured to store a respective printing core module. Thus, upon connection the print-head may send the printing core module for dynamic reconfiguration, as explained in example operation 59.

Example Operation 65

According to some of the example embodiments, the receiving 62 may further comprise receiving 65 the currently used print technology via a user input. The detection unit 41 may be configured to perform the receiving 65.

It should be appreciated that the user input may also comprise the printing core module which is to be used for the dynamic reconfiguration.

Example Operation 66

According to some of the example embodiments, FPGA is also configured to dynamically reconfigure 66 at least one printing core module based on the currently used print technology. The dynamic reconfiguring is performed by a configuration unit 42. It should be appreciated that the configuration unit may be configured as a common printing peripheral module.

Example Operation 68

According to some of the example embodiments, the dynamic reconfiguration 66 may further comprise selecting 68 the at least one printing core module from a plurality of preconfigured printing core modules. The pre-configuration is based on the printing technology and the selecting 68 is based on the currently used print technology. The configuration unit 42 may be configured to perform the selecting 68.

It should be appreciated that the plurality of preconfigured printing core modules may be stored in memory. The memory may be a print-head memory, a PFGA memory, and/or a FPGA accessible memory.

Example Operation 69

According to some of the example embodiments, the FPGA may be further configured to synchronize 69 a plurality of external printing microprocessors with an internal FPGA timer, as described in FIG. 4. It should be appreciated that the internal FPGA timer may be configured as a common printing peripheral module.

Example Operation 70

According to some of the example embodiments, the FPGA may be further configured to measure 70 print behavior and/or print performance with the internal FPGA timer.

Example Operation 71

According to some of the example embodiments, the FPGA may be further configured to read out 71 print data based on a trigger with a direct FPGA memory access. It should be appreciated that this functionality may be configured as a common printing peripheral module.

Example Operation 72

According to some of the example embodiments, the print data may be updated 72 once the print data has been changed. It should be appreciated that the updating 72 may be performed by a CPU.

Example Operation 73

According to some of the example embodiments, the detecting 60 may also comprise detecting 73 at least a second currently used print technology. It should be appreciated that the detection unit 41 may be configured to perform the detecting 73.

Example Operation 74

According to some of the example embodiments, the dynamic reconfiguration 66 may further comprise dynamically reconfiguring 74 a second printing core module based on the second currently used print technology. The first printing core module and the second printing core module may be simultaneously operable. Thus, according to some of the example embodiments, the FPGA may be able to simultaneously handle the printing for various types of printing technologies. The configuration unit 42 may be configured to perform the dynamic reconfiguration 74.

Figure 7:
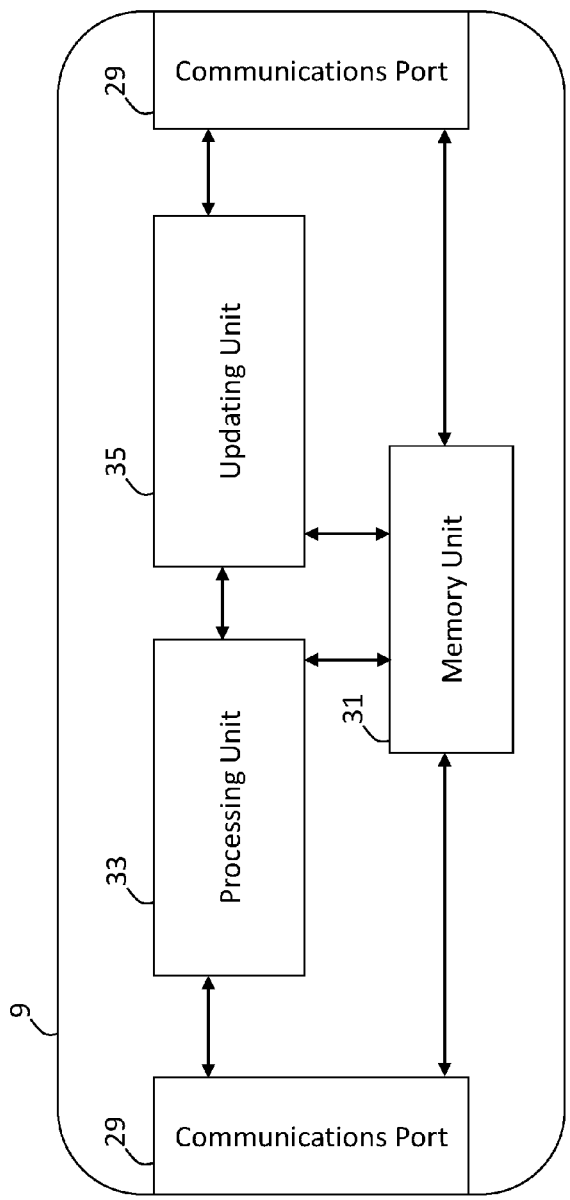
FIG. 7 is a schematic of a printing unit that may be utilized for direct memory access printing, according to some of the example embodiments.

FIG. 7 is a schematic of an industrial printing unit 9, according to some of the example embodiments. The printing unit 9 may comprise any number of communication ports 29 that may be able to transmit or receive any number or type of signals, data, and/or instructions. The communications ports 29 may also be configured to read out or send data to a printer for printing. It should be appreciated that the printing unit 9 may alternatively comprise a single transceiver port. It should further be appreciated that the communication ports 29 or transceiver port may be in the form of any input/output communications port known in the art.

The printing unit 9 may also comprise at least one memory unit 31. The memory unit 31 may be configured to store received, transmitted, and/or measured data and/or executable program instructions. The memory unit 31 may also be configured to store print data or data which is to be printed. The memory unit 31 may be any suitable type of computer readable memory and may be of volatile and/or non-volatile type.

The printing unit 9 may further comprise a general processing unit 33. The printing unit 9 may also comprise an updating unit 35. The updating unit 35 may be configured to update the print data if a change in the print data has been detected.

It should be appreciated that the general processing unit 33 and updating unit 35 need not be comprised as separate units. Furthermore the generally processing unit 33 and the updating unit 35 may be any suitable type of computation unit, e.g. a microprocessor, or a digital signal processor (DSP).

Figure 8:
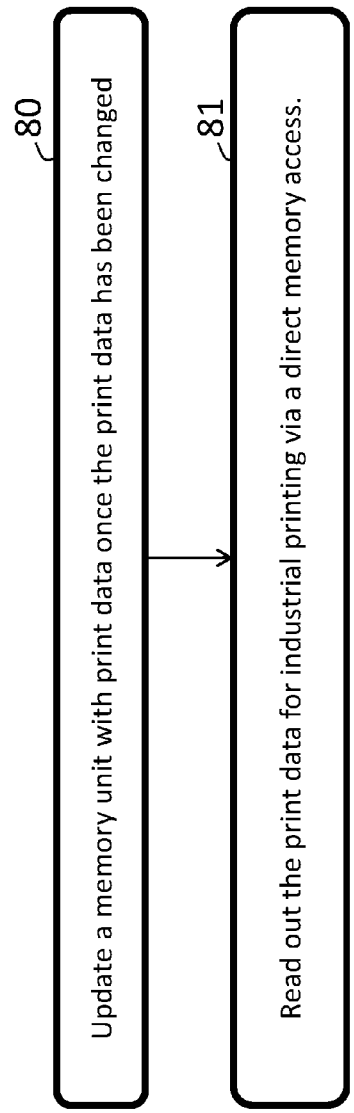
FIG. 8 is a flow diagram depicting example operations which may be taken by the printing unit of FIG. 7, according to some of the example embodiments.

FIG. 8 is a flow diagram depicting example operations which may be taken by the industrial printing unit of FIG. 7.

Example Operation 80

According to some of the example embodiments, the industrial printing unit is configured to update 80 a memory unit with print data once the print data has been changed. The updating unit 35 is configured to perform the updating 80.

Example Operation 81

According to some of the example embodiments, the industrial printing unit is further configured to read out 81 the print data for industrial printing via a direct memory access based on a received trigger. The communications port 29 is configured to perform the reading out 81.

According to some of the example embodiments the industrial printing unit may be located in the FPGA and the reading out may be performed without CPU assistance.

In other example embodiments the industrial printing unit may be located in a print-head. In some example embodiments the industrial printing unit may be located in the CPU. In the case that the industrial printing unit is located in the CPU, the industrial printing may be performed without the assistance of the FPGA. In other example embodiments the industrial printing unit may be located in a microprocessor.

The above mentioned and described embodiments are only given as examples and should not be limiting to the present invention. Other solutions, uses, objectives, and functions within the scope of the invention as claimed in the below described patent claims should be apparent for the person skilled in the art.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be comprised within the scope of this disclosure. Although specific terms may be employed herein, they are used in a generic and descriptive sense only and not for purpose of limitation.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVD), flash memory, EEPROM, etc. Generally, program modules may comprise routines, programs, objects, components, data structures, etc. that performs particular tasks or implement particular abstract data types. Computer-executable instructions, associated data structures, and program modules represent examples of program code for executing steps of the methods disclosed herein. Such instructions may be executed by the processing unit, e.g., central processing unit, microcontroller, microprocessor, field programmable gate array, application specific integrated circuit, digital signal processor, etc. The particular sequence of such executable instructions or associated data structures represents examples of corresponding acts for implementing the functions described in such steps or processes.

The invention claimed is:

1. A method in a Field Programmable Gate Array (FPGA) device, for processing a print assignment, the FPGA comprising at least one common printing peripheral module, said common printing module being common with respect to different printing head types, the method comprising:
   detecting a currently used print-head type, wherein the currently used print-head type is a first current used print-head type;
   dynamically reconfiguring at least one printing core module with respect to print head type, wherein the at least one printing core module is a first printing core module;
   detecting at least a second currently used print-head type;
   dynamically reconfiguring a second printing core module based on the second currently used print-head type, wherein first printing core module and the second printing core module are simultaneously operable;
   reading out print data, based on a trigger signal, by an FPGA controlling printing by directly accessing print data from a memory, wherein the reading out is performed without CPU assistance; and
   synchronizing a plurality of externally arranged printing microprocessors connected to an internal FPGA timer.

2. The method of claim 1, wherein the detecting the print-head type further comprises receiving a print-head identification from a connection port, and determining the current used print-head type depending on the print-head identification.

3. The method of claim 2, comprising receiving used print-head type identification further comprises receiving the print-head type via a user input.

4. The method of claims 2, comprising receiving the connected print head type further comprises receiving a voltage reading with respect to a print-head connection, and determining the print-head type identification with respect to a value of the voltage reading.

5. The method of claim 2, wherein the receiving the print-head type identification further comprises receiving the print-head identification from a designated head connector.

6. The method of claim 2, wherein the plurality of programmed printing core modules is stored in memory.

7. The method of claim 6, wherein the memory is a print-head memory, an FPGA memory, and/or a FPGA accessible memory.

8. The method of claim 1, wherein the dynamically reconfiguring further comprising selecting the at least one printing core module from a plurality of preconfigured printing core modules, wherein the pre-configuration depends on a print-head type, and the selecting depends on the connected used print-head type.

9. The method of claim 1, further comprising measuring print output with said internal FPGA timer.

10. The method of claim 9, comprising updating said print data.

11. The method of claim 10, wherein the print data is updated by a Central Processing Unit (CPU) of the printer.

12. The method of claim 1, wherein print-head type comprises at least one of a vector, raster, and/or RFID type.

13. A Field Programmable Gate Array (FPGA) device for processing a print assignment, said FPGA comprising:
at least one common printing peripheral module, said common printing peripheral module being common with respect to different print-head types;
a detection unit configured to:
detect a currently used print-head type, wherein the currently used print-head type is a first current used print-head type; and to
detect at least a second currently used print-head type;
a configuration unit configured to:
dynamically reconfigure at least one dynamically reconfigurable printing core module, said at least one dynamically reconfigurable printing core module being reconfigurable based on a connected print-head type, wherein the at least one printing core module is a first printing core module; and to
dynamically reconfigure a second printing core module based on the second currently used print-head type, wherein first printing core module and the second printing core module are simultaneously operable;
wherein the FPGA device is configured to:
read out print data, based on a trigger signal, in FPGA controlled printing by directly accessing print data from a memory, wherein the reading out is performed without CPU assistance, and to:
synchronize a plurality of externally arranged printing microprocessors connected to an internal FPGA timer.

14. The FPGA of claim 13, wherein the at least one common printing peripheral further comprises at least one of an encoder interface, trigger functionality, interrupt capturing mechanisms, status functionality, and/or input/output functionality.

15. The FPGA of claim 13, further comprising a plurality of preconfigured printing core modules, wherein pre-configuration depends on a print-head type.

16. The FPGA of claim 15, wherein the plurality of preconfigured printing core modules are stored in a memory unit, said memory unit being a print-head memory, an FPGA memory, and/or a FPGA accessible memory.

17. The FPGA of claim 13, configured to update said print data.

18. The FPGA of claim 17, comprising a Central Processing Unit (CPU) for updating print data.

19. The FPGA of claim 13, wherein print-head type comprises at least one of a vector, raster, and/or RFID type.

20. A method of reading out print data in a printing unit according to claim 13.

21. A printing unit for reading out print data, the printing unit comprising a Field Programmable Gate Array (FPGA) for processing a print assignment, said FPGA comprising:
at least one common printing peripheral module, said common printing peripheral module being common with respect to different print-head types;
a detection unit configured to detect a currently used print-head type, wherein the currently used print-head type is a first current used print-head type;
a configuration unit configured to dynamically reconfigure at least one dynamically reconfigurable printing core module, said at least one dynamically reconfigurable printing core module being reconfigurable based on a connected print-head type, wherein the at least one printing core module is a first printing core module;
wherein the detection unit is further configured to detect at least a second currently used print-head type;
wherein the configuration unit is further configured to dynamically reconfigure a second printing core module based on the second currently used print-head type, wherein the first printing core module and the second printing core module are simultaneously operable
and
wherein the FPGA is configured to:
read out print data, based on a trigger signal, in FPGA controlled printing by directly accessing print data from a memory, wherein the reading out is performed without CPU assistance, and to
synchronize a plurality of externally arranged printing microprocessors connected to an internal FPGA timer.

* * * * *